(12) United States Patent
Leaird et al.

(10) Patent No.: US 6,577,782 B1
(45) Date of Patent: Jun. 10, 2003

(54) DIRECT SPACE-TO-TIME PULSE SHAPER AND OPTICAL PULSE TRAIN GENERATOR

(75) Inventors: Daniel E. Leaird, West Lafayette, IN (US); Andrew M. Weiner, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/668,682

(22) Filed: Sep. 22, 2000

Related U.S. Application Data
(60) Provisional application No. 60/200,774, filed on Apr. 28, 2000, and provisional application No. 60/155,674, filed on Sep. 23, 1999.

(51) Int. Cl.[7] ............................................... G02B 6/26
(52) U.S. Cl. ......................................... 385/15; 359/127
(58) Field of Search ............................... 385/14–15, 24; 359/124, 127

(56) References Cited

U.S. PATENT DOCUMENTS

| | | |
|---|---|---|
| 4,655,547 A | 4/1987 | Heritager et al. |
| 5,682,262 A * | 10/1997 | Wefers et al. ............... 359/305 |
| 5,734,470 A * | 3/1998 | Rogers et al. ............... 356/354 |

FOREIGN PATENT DOCUMENTS

| | | |
|---|---|---|
| EP | 0 703 679 A2 | 3/1996 |
| WO | WO99/42872 | 8/1999 |

OTHER PUBLICATIONS

Katsunari Okamoto, "Recent Progress of Integrated Optics Planar Lightware circuits," Optical and Quantum Electronics, 31:107–129, 1999.

R. Adar et al., "Broad–Band Array Multiplexers Made with Silica Waveguides on Silicon," Journal of Lightwave Technology, 11:2:212–219, Feb. 1993.

D.E. Laird et al., "Chip Control in the Direct Space–to–Time Pulse Shaper," Optics Letters, 25:11:850–852, Jun. 1, 2000.

D.E. Laird et al., "Chirp Compensation in a Femosecond Direct Space–to–Time Optical Pulse Shaper," Conference on Lasers and Electro–Optics, OSA Technical Digest, pp. 185–186, May 23–28, 1999.

D.E. Laird et al., "Femosecond Optical Packet Generation by a Direct Space–To–Time Pulse Shaper," Optics Letters, 24:12:853–855, Jun. 15, 1999.

(List continued on next page.)

Primary Examiner—Akm E. Uliah
Assistant Examiner—Jerry T Rahll
(74) Attorney, Agent, or Firm—Fish & Richardson P.C.

(57) ABSTRACT

Direct space-to-time pulse shaping and optical pulse train generation is achieved in the present invention which features an optical transmitter that includes: an input port receiving a pulsed light beam; a planar modulator coupled to said input port to spatially pattern the beam; a spectral disperser receiving the patterned beam to spectrally disperse and direct the patterned beam; a focus element receiving the dispersed beam and producing a focused beam; and an output port having an aperture positioned to receive a portion of the focused beam.

148 Claims, 10 Drawing Sheets

OTHER PUBLICATIONS

D.E. Laird et al., "Direct Space–to–Time Conversion for Ultrafast Waveform Generation," Conference on Lasers and Electro–Optics, OSA Technical Digest, pp. 99–100, May 3–8, 1998.

P. Emplit et al., "Picosecond Dark Soliton Over a 1–km Fiber at 850 nm," Optics Letters, 18:13:1047–1049, Jul. 1, 1993.

C. Sauteret et al., "Passive Pulse Shaping by Spectral Narrowing of Picosecond Pulses," Applied Optics, 20:8:1487–1490, Apr. 15, 1981.

P. Emplit et al., "Passive Amplitude and Phase Picosecond Pulse Shaping," Optics Letters, 17:19:1358–1360, Oct. 1, 1992.

B. Colombeau et al., "Shaping of Short Laser Pulses by Passive Optical Fourier Techniques," Optics Communications, 19:2:201–204, Nov. 1976.

P. Emplit et al., "Picosecond Steps and Dark Pulses Through Nonlinear Single Mode Fibers," Optics Communications, 62:6:374–379, Jun. 15, 1987.

C. Froehly et al., "Shaping and Analysis of Picosecond Light Pulses," Progress in Optics, E. Wolf Edition 20:65–153 (1983).

A.M. Weiner et al., "Picosecond and Femtosecond Fourier Pulse Shape Synthesis," Revue Phys. Appl. 22:1619–1628 (1987).

A.M. Weiner et al., "Femtosecond Optical Pulse Shaping and Processing," Prog. Quant. Electr., 19:161–237 (1995).

D.E. Laird et al., "Wavelength Tunable Femtosecond Pulse Trains From a Direct Space–to–Time Pulse Shaper," Conference on Lasers and Electro–Optics, OSA Technical Digest, pp. 410–411 May 7–12, 2000.

Kurokawa et al., "Time–Space–Conversion Optical Signal Processing Using Arrayed–Waveguide Grating," Electronics Letters, 33:22: 1890–1891, Oct. 23, 1997.

Takenouchi et al., "Differential Processing of Ultrashort Optical Using an Array–Waveguide Grating with Phase–Only Filter," Lasers and Electro–Optics, 1988, Cleo 98. Summaries of the Papers Presented at the Conference on 1998. May 5, 1998, p. 98.

Okamoto et al., "Fabrication of Frequency Spectrum Synthesiser Consisting of Arrayed–Waveguide Grating Pair and Thermooptic Amplitude and Phase Controllers," Electronics Letters, 35:9:733–734, Apr. 29, 1999.

Leaird et al., "Chirp Compensation in a Femtosecond Direct Space–to–Time Optical Pulse Shaper," Lasers and Electro–Optics, 1999. Presented at the Conference on May 25, 1999. pp. 185–186.

Mikhailov et al., "Transmission of Densely–Spaced 10 Gbit/s WDM Channels Using a Dispersion–Compensated, Amplified Recirculating Fibre Loop and Concave Grating Demultiplexer," IEE Colloquium on Multiwavelength Optical Networks: Devices, Systems and Network Implementations. Day One (Ref. No. 1998/.257), pp. 12/1–4, 1998, London, UK, IEEE, UK.

D.E. Leaird and A.M. Weiner, "Ultrafast Optoelectronic Mux Apparatus," Optical Society of America Annual Meeting 1998, Baltimore, MD, Oct. 4, 1998 thru Oct. 9, 1998.

D.E. Leaird and A.M. Weiner, "The Role of Lens–Slit Separation for Chirp Compensation in a Direct Space to Time Femtosecond Pulse Shaper," Ultrafast Optics and Optoelectronics, Aspen, CO, Apr. 12, 1999 thur Apr. 16, 1999.

D.E. Leaird and A.M. Weiner, "500 GHz Wavelength–Division Multiplexed Pulse Train Generation from a Direct Space–to–Time Pulse Shaper," Optical Society of America Annual Meeting, Santa Clara, CA, Sep. 26, 1999 thru Sep. 30, 1999.

* cited by examiner

DIRECT SPACE-TO-TIME PULSE SHAPER AND OPTICAL PULSE TRAIN GENERATOR

STATEMENT OF RELATED APPLICATIONS

This non-provisional patent application is based upon U.S. Provisional Patent Application Ser. No. 60/155,674 filed Sep. 23, 1999 in the names of the same inventors and commonly assigned herewith and upon U.S. Provisional Patent Application Ser. No. 60/200,774 filed Apr. 28, 2000 in the names of the same inventors and commonly assigned herewith. Both of these provisional applications are hereby incorporated herein by reference as if set forth fully herein.

STATEMENT OF GOVERNMENT RIGHTS IN THE INVENTION

The present invention was made with support from the United States Government under Grant numbers F 49621-05-1-0533 and F 49620-95-1-0533 awarded by the U.S. Air Force Office of Scientific Research and Grant Number DAAG55-98-1-0514 awarded by the U.S. Army Research Office. The United States Government has certain rights in the present invention.

BACKGROUND OF THE INVENTION

1. Field of the Invention

This invention relates to optical data telecommunications. Specifically, this invention relates to an apparatus and method for transmitting data in optical data telecommunications systems and generating data-modulated optical pulse trains for use in such systems. The invention also finds applicability in the field of optical computing.

2. The Related Art

Pulse shaping methods allowing synthesis of complex femtosecond optical waveforms according to specification are well known in the art. As usually practiced, the output waveform is determined by the Fourier transform ("FT") of a spatial pattern transferred by a mask or a modulator array onto the dispersed optical spectrum. As an example, the FT optical pulse shaper is widely used for synthesis of complex femtosecond waveforms. In this geometry, the temporal profile of the output waveform is given by the FT of the mask pattern that is transferred onto the optical frequency spectrum of the pulse. FT pulse shaping was first demonstrated for use in simple pulses of tens of picoseconds in duration. Pulse shaping was then extended to the sub-100 femtosecond (fs) ($10^{-15}$ second) time scale and demonstrated highly structured waveforms using microlithographically patterned pulse shaping masks. The introduction of liquid crystal modulator arrays and acousto-optic (A/O) modulators into FT pulse shapers led to computer programmable pulse shaping, with millisecond and microsecond reprogramming times, respectively, and widespread adoption of this technique.

FT pulse shapers work well in areas of short-pulse optics. However, for applications in the field of high-bit-rate data telecommunications (i.e., >$10^9$ bits/second), use of the FT pulse shaper for the generation of 'pulse packets' presents various difficulties. If a user wants to use the FT pulse shaper to generate pulse-packets (i.e. sequences of pulses where each pulse corresponds to a 'bit' in a data sequence) with a fast (sub-nanosecond) frame update rate, the FT of the desired pulse sequence must be calculated and applied to the pulse shaping modulator array at a rate equal to or greater than the frame-update rate. In general, calculating a FT every nanosecond (or faster) is both difficult and undesirable. Further, in general, a complex modular array is required in order to map the required FT onto the optical frequency spectrum of the short pulse.

It would therefore be high desirable to have a direct (rather than an FT) mapping between a spatial pattern and the resultant ultrafast optical waveform for use in high-bit-rate data telecommunications. As processor speed and data telecommunications network bandwidth increases, photonics will offer significant advantages in high performance computing systems. The Input/Output (I/O) subsystem will be the first area where photonic technologies will have a major impact in the high performance computing environment. Interconnect technology, at either the system or processor level, will be enhanced by combining multiple fast electronic signals onto a single (or multiple) ultrafast (exceeding $10^{10}$ bits/second) optical channel for intermodule communication. In high performance computing systems, combining output data words from fast electrical interfaces and serializing them for transfer over an ultrafast optical channel to other high performance systems is a key application where photonics will play a significant role. For example, one may want to convert a parallel electronic data word to an ultrafast optical serial data packet by using a suitable pulse shaping geometry containing an optoelectronic modular array driven by the data word (i.e., in parallel). Thus, it is beneficial and desirable that each bit in the output optical data packet be associated with a single modulator element, both for simplicity and because the need to compute an FT before setting the state of the modulator array would restrict operation to relatively low packet rates.

Research in increasing the data rate per fiber in optical networking has focused on time-division multiplexed ("TDM") and wavelength-division multiplexed ("WDM") transmission. In general, the TDM systems can operate at a data rate of up to about 100 Gbits/s or more per channel. WDM systems operate on at least two channels (typically four or more) in parallel although each operates typically at a lower rate than TDM systems, generally 2.5 up to about 10 Gbits/s. Until recently, there has been little progress in combining TDM and WDM topologies to form a hybrid high channel rate, large number of channels per fiber system. Research has focused on either increasing the speed of a single channel per fiber, or accepting a 'low' rate while working to radically increase the number of channels per fiber.

Thus, there is an ongoing need for further improvements in optical data telecommunications to increase the data rate per fiber in optical networking systems to beyond 100 Gbits/s.

These and other features and advantages of the present invention will be presented in more detail in the following specification of the invention and in the associated figures.

SUMMARY OF THE INVENTION

Direct space-to-time pulse shaping and optical pulse train generation is achieved in the present invention by first generating a controlled pulsed light beam and applying the beam to a pixelator such as a mask or a diffractive optical element (DOE) to obtain a pixelated beam. The spatially patterned beams generated by the pixelator is imaged onto a planar modulator. The individual spot size and spacing from the pixelation optics as well as the imaging system magnification are selected to match the linear array of spots from the pixelation optics to a one-dimensional amplitude modulator array—one spot per modular array element. The final operation of the mask generation optics is to image the one-dimensional spatial pattern reflected from (or transmitted thereof) the modulator array onto a spectral dispersing element such as a diffraction grating. The mask generation optics generates a one-dimensional array of spots on the spectral dispersing element where the relative "height" or average power of each spot can be controlled by an individual element in a high-speed optoelectronic modulator array. In this way, different spatial patterns ("pulse packets"—a sequence of optical spots in a one-dimensional array) can be manipulated on the surface of the spectral dispersing element by electronically controlling the optical reflectivity/transmissivity state of individual elements of the optoelectronic modulator array. The pulse shaping is accomplished by applying the light diffracted by the spectral dispersing element to a lens and then to a thin slit. The beam passing through the thin slit may then be applied to an appropriate photonic transmission medium (air-vacuum, fiber optic cable, etc.) for transmission to a receiver where it may be demodulated by a suitably fast photo diode, other conventional photonic receiver, or various optical demodulation devices.

BRIEF DESCRIPTION OF THE DRAWINGS

The accompanying drawings, which are incorporated in and constitute a part of this Specification, illustrate one or more embodiments of the invention and, together with the present description, serve to explain the principles of the invention.

In the drawings:

FIG. 8A and FIG. 8B demonstrate periodic pulse train capabilities of the present invention.

FIG. 8C and FIG. 8D demonstrate the parallel to serial conversion to pulse packet capability of the present invention.

DESCRIPTION OF THE PREFERRED EMBODIMENTS

A number of embodiments of the present invention are described herein in the context of an optical transmitter. Those of ordinary skill in the art will realize that the following description of the present invention is illustrative only and not in any way limiting. Other embodiments of the invention will readily suggest themselves to such skilled persons having the benefit of this disclosure. Reference will now be made in detail to implementations of the present invention as illustrated in the accompanying drawings. The same reference numbers will be used throughout the drawings and the following description to refer to the same or like parts.

In the interest of clarity, not all the routine features of the implementations described herein are described. It will of course be appreciated that in the development of any such actual implementation, numerous implementation-specific decisions must be made to achieve a developers' specific goals, such as compliance with system and business related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Direct Space-To-Time Pulse Shaper

Figure 1A:
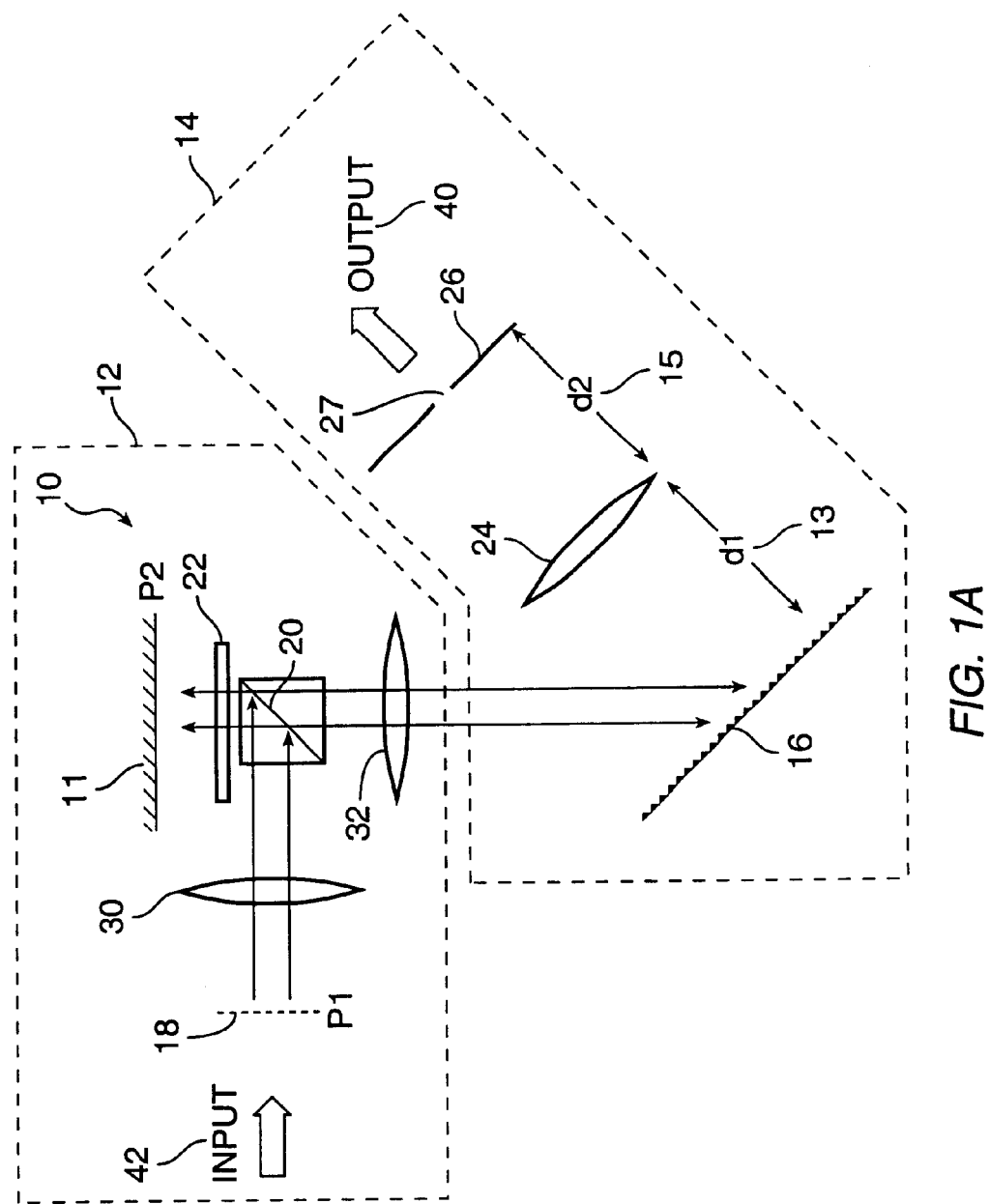
FIG. 1A is a schematic diagram of a direct space to time pulse shaping apparatus in accordance with a specific embodiment of the present invention.

Referring to FIG. 1A, one embodiment of the direct space-to-time ("DST") pulse shaper 10, comprises two major functional groups: 1) Mask generation optics 12, and 2) Pulse shaping optics 14. The combination of these two components is a new apparatus for the shaping of ultra short optical pulses where there is a direct mapping between the spatial position of the masking function and the temporal position in the output waveform. It is possible to achieve optical responses in the femto second range (i.e., $<10^{-13}$ sec) which: 1) avoids the need to perform a FT to determine a masking function for each new packet (which would be very difficult to accomplish at high update rates); and 2) permits data packet generation. Such data packet generation using FT shaping typically requires that both spectral amplitude and phase be precisely controlled. Pulse sequence generation with the DST shaper 10 requires only intensity modulation.

Figure 1B:
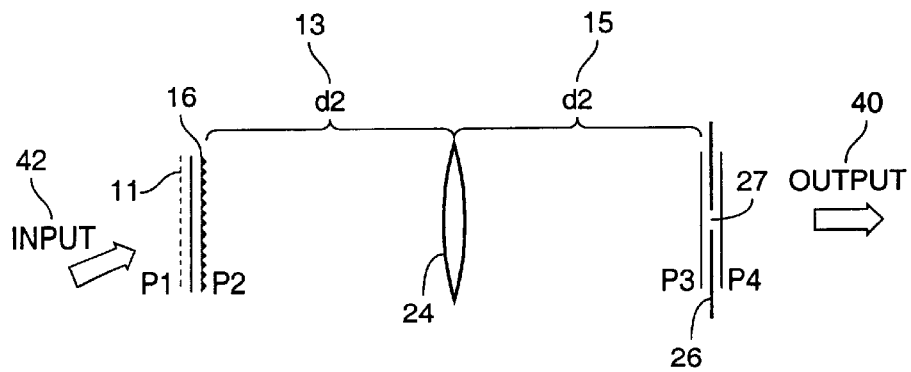
FIG. 1B is a schematic diagram of a direct space to time pulse shaping apparatus in accordance with another specific embodiment of the present invention.

One idealized embodiment of the invention, illustrated schematically in FIG. 1B, will be used to describe the space to time conversion behind the DST pulse shaper. A planar modulator 11 is positioned in front of a spectral disperser element 16 such as a diffraction grating. Many such planar modulators are known in the art. The planar modulator 11 may be a fixed transmission mask, a fixed reflection mask, a spatial light modulator (transmissive or reflective), a hologram, a diffractive mask, or any combination of these planar modulators. The planar modulator 11 imposes a spatial pattern onto a beam which is then imaged from the diffraction grating 16 through lens 24. Although a diffraction grating 16 is used as the spectral dispersing element in this embodiment, other spectral dispersing elements on spectral dispersers may be used instead such as a prism, a Fabry-Perot etalon, or an integrated optic spectral disperser (e.g. an arrayed waveguide grating). Lens 24 images the spectral dispersing element onto an output port 26 having a slit 27. Although a lens 24 is used in this embodiment, any other focusing element may be used such as a curved mirror. The spectral dispersing element could also be modified to incorporate this function. For example, a curved diffraction grating, or in the case of an integrated optic spectral disperser, an arrayed waveguide array forming a curved grating may be used. In essence, the focus element comprises a curved portion of the spectral disperser.

Furthermore, although the output port 26 shown in FIG. 1B has one output slit 27, the output port 26 may include more than one slit. In fact, the output port 26 may contain one or more fiber optic filaments or integrated optic waveguides rather than slits to receive the dispersed spectrum.

In FIG. 1B, the distance, $d_1$ 13, between the spectral disperser 16 and the lens 24 as well as the distance, $d_2$ 15, between the lens 24 and the output port 26 are equal to the focal length, f, which is the distance where a collimated beam comes to focus after going through a lens. However, in practice, the distances, $d_1$ or $d_2$, may vary from the focal length, f, as will be discussed further below.

In discussing the physics of the DST pulse shaper, the following FT relations are listed for completeness:

$$F(\omega) = \frac{1}{\sqrt{2\pi}} \int dt f(t)\exp[-j\omega t] \quad (1)$$

$$f(t) = \frac{1}{\sqrt{2\pi}} \int d\omega F(\omega)\exp[j\omega t]$$

$$S(k) = \frac{1}{\sqrt{2\pi}} \int dx s(x)\exp[jkx]$$

$$s(x) = \frac{1}{\sqrt{2\pi}} \int dk S(k)\exp[-jkx]$$

At P1, the field of an optical pulse will be:

$$e_1(x, t)=s(x)e_{in}(t) \; s(x)\int d\omega E_{in}(\omega)exp(j\omega t) \quad (2)$$

where: $e_{in}(t)$ is the temporal profile of the input field.

$E_{in}(\omega)$ is the input spectrum x is the transverse spatial coordinate

Assuming a diffraction grating dispersion that is linear in space and frequency, the spectrum at P2 is:

$$e_2(x, t) \; s(x)\int d\omega E_2(x,\omega)exp(j\omega t) \quad (3)$$

where $$E_2(x, \omega) \; s(\beta x)exp(-j\gamma\omega x)E_{in}(\omega)$$

The spatial dispersion is written $$\gamma = \frac{\lambda}{cd\cos\theta_d} \quad (4)$$

where: $\lambda$ is the center wavelength;

c is the speed of light;

d is the period of the diffraction grating; and $\theta_d$ is the angle of diffraction.

The astigmatism of the diffracting grating is included with the term $$\beta = \frac{\cos\theta_i}{\cos\theta_d} \quad (5)$$

where: $\theta_i$ is the incident angle.

Assuming that the distance, $d_1$ 13, between the diffraction grating 16 and lens 24 and the distance, $d_2$ 15, between the lens 24 and output port 26 are equal to the focal lens of the lens, f (FIG. 1B), then the field at P3 is the FT of equation (3):

$$e_3(x, t) \propto \int d\omega E_{in}(\omega)S\left(\frac{2\pi x}{\beta\lambda f} - \frac{\gamma\omega}{\beta}\right)\exp(j\omega t) \quad (6)$$

Assuming a thin slit 27 at the output port 26 at position x=0, the spectrum at P4 is:

$$e_4(x, t) \propto \int d\omega E_{in}(\omega)S\left(-\frac{\gamma\omega}{\beta}\right)\exp(j\omega t) \quad (7)$$

The temporal profile is now determined by the FT of the output spectrum:

$$e_4(t) \propto e_{in}(t) * s\left(\frac{-\beta}{\gamma}t\right) \quad (8)$$

The output temporal profile is then given by the input pulse convolved with a scaled representation of the spatial profile at the diffraction grating with the space-to-time conversion constant:

$$\frac{\gamma}{\beta} = \frac{\lambda}{cd\cos\theta_i} \quad (9)$$

Figure 4:
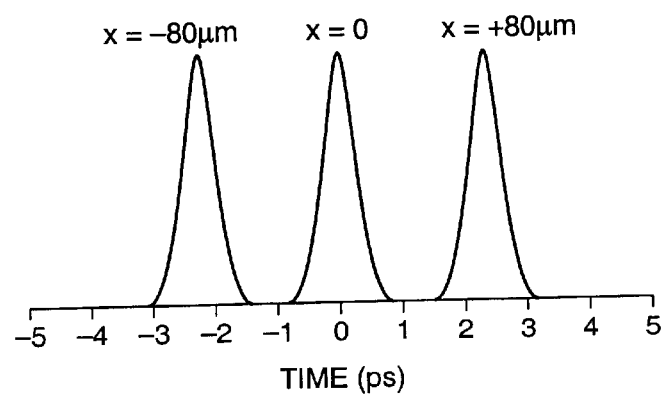
FIG. 4 is a cross-correlation graph where the thin slit is translated into three different positions in accordance with a specific embodiment of the present invention.

To determine the space-to-time conversion constant, Eqn (9) must be multiplied by the imaging system magnification. The pixelation plane 18 (FIG. 1A) is replaced with a thin slit of known width and intensity cross-correlation traces are obtained and recorded for several different locations of the slit in the transverse plane. FIG. 4 shows the results of cross-correlation measurements where a 10 micron slit has been translated to three different positions separated by 80 micron. The pulse delay from one position to the next gives a direct measure of the space-to-time conversion constant. Measuring the change in delay from one trace to the next gives a measured conversion constant of 31.2 ps/mm, which is in agreement with the calculated value of 30.98 ps/mm obtained by multiplying the space-to-time conversion constant, 8.45 ps/mm, by the overall imaging system magnification of 3.66. The results also show that the center wavelength of the output beam 40 may be changed by merely changing the position of the slit at the output port 26 yet the intensity profile remains the same.

Figure 2:
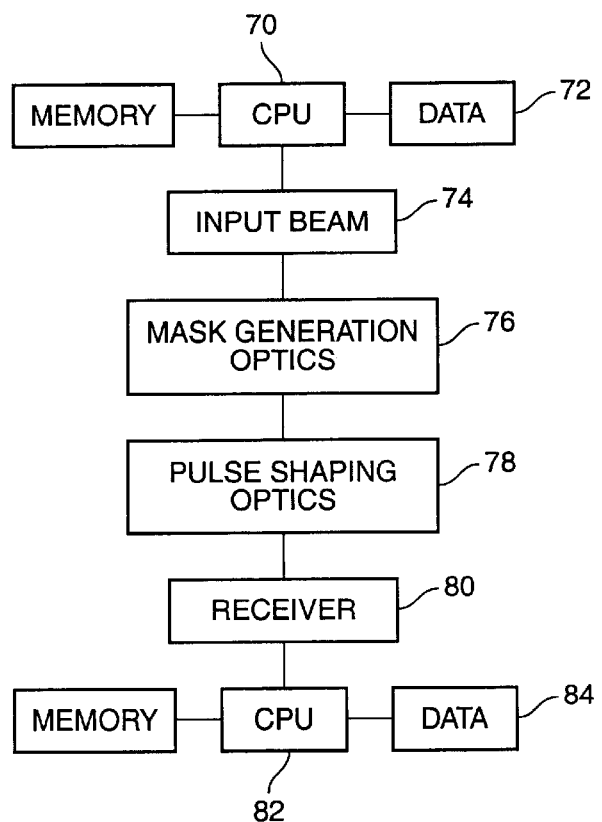
FIG. 2 is a block diagram of one specific embodiment of the present invention.

Now referring to FIG. 2, in this embodiment, data 72 may be sent to a central processing unit ("CPU") 70 that is programmed to input the pulsed beams as well as input the data on the planar modulator. The pulsed beam 74 is sent through the mask generation optics 76 and imaged onto the pulse shaping optics 78 where it is outputted to a receiver 80. Another central processing unit 80 at the receiving end receives the beam and reconfigures the data 84 for analysis.

FIG. 1B is an idealized embodiment of the DST pulse shaper. However, the embodiment illustrated in FIG. 1A is a more complete and useful embodiment for use in optical data telecommunications. The purpose of the mask generation optics 12 is to transfer a one-dimensional spatially patterned intensity profile onto a spectral disperser, here shown as a diffraction grating 16.

In accordance with FIG. 1A, a short pulse input beam 42 which was, in one implementation, an 850 nm beam from a Ti:S laser with 100 fs pulses, is pixelated through a planar pixelator 18 (thereby creating an array of spots) and imaged through a first lens 30 onto a beam splitter 20. The purpose of the planar pixelator 18 is to spatially pattern the pulsed input beam 42 into an array of spots for imaging into a planar modulator 11. The pixelator 18 is an amplitude mask consisting of a periodic one-dimensional pattern of clear windows in an otherwise opaque metal film.

The beam is preferably pulsed in the picosecond or femtosecond range, thereby giving it a broad bandwidth. The beam splitter 20 directs the beam through a quarter waveplate 22 circularly polarizing the beam and imaging it onto a planar modulator 11. As discussed above, planar modulator 11 may be a fixed transmission mask, a fixed reflection mask, a spatial light modulator (transmission or reflective), a hologram, a diffractive mask or a combination of any of these. As an example, the planar modulator may be a fixed amplitude mask that is fabricated using standard lithographic techniques known in the art to pattern a gold layer deposited onto a glass substrate. Furthermore, the planar modulator used in this embodiment may be a reflective spatial light modulator for use in reflecting the beam to the spectral disperser after going through the quarter waveplate and the beam splitter, as further discussed below. Those skilled in the art will realize that the instrument determines the type of spatial light modulator to use. Thus, in the embodiment described above, if no reflection to the spectral disperser is necessary, the transmissive spatial light modulator may be used.

The individual pixelated beams as well as the imaging system magnification are programmed to match the array of spots on the planar modulator 11 which correspond to electronic data bits. Thus, there is a one-to-one mapping between the pixelator 18 and the planar modulator 11 for the pixelated beams to have data bits individually modulated thereon.

The modulated beam is then reflected from the planar modulator 11, back through the quarter waveplate 22. A second lens 32 then images the modulated beam onto the diffraction grating 16. As stated above, the diffraction grating 16 is only one spectral disperser that may be used. Other spectral dispersers known in the art may also be used such as a prism, a Fabry-Perot etalon, or an integrated optical spectral disperser.

The diffraction grating 16, preferably a ruled diffraction grating having 1800 lines per millimeter, directs the beam to a focusing element, shown here as a third lens 24. The lens 24 focuses the beam onto an output port 26 having a single narrow slit, for example at 20 microns, to produce pulse waveforms with pulses repeating at rates that may be in the hundreds of GHz or even THz range. Although the output port 26 shown in FIG. 1A has one slit 27, the output port may have more than one slit or instead of slits, the light may be directed to individual optical fibers.

Figure 3:
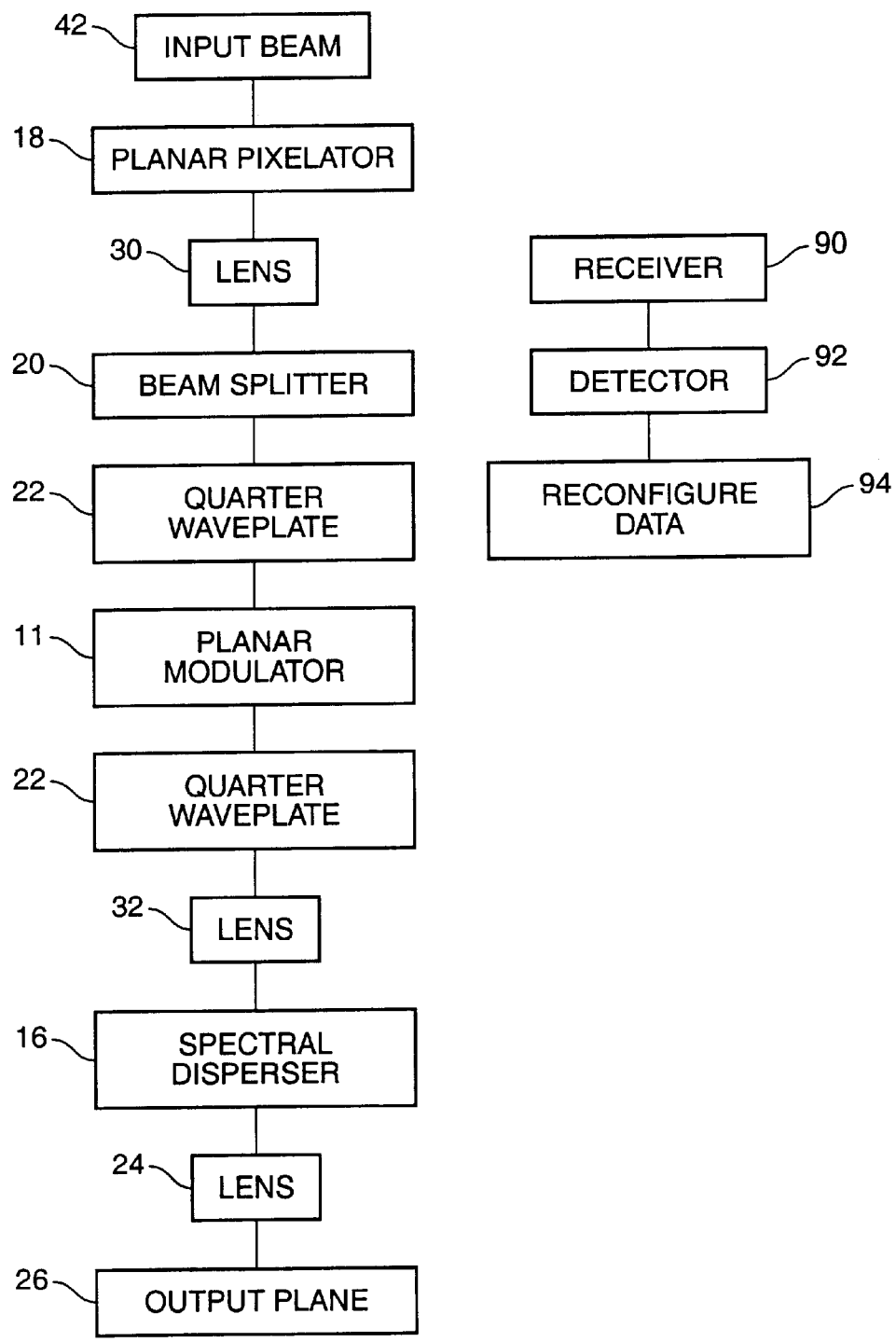
FIG. 3 is a block diagram of one specific embodiment of the present invention.

Now referring to FIG. 3, a receiver 90 receives the beams from the output port 26 to a detector 92 to reconfigure the data 94. The detector may be a fast photodiode, a cross-correlation device, or any other measuring instruments that are well known in the art.

In effect, a one-dimensional array of spots is created and placed onto the diffraction grating 16, which gives the temporal output profile of the system as a sequence of pulses. The individual pulse widths are set by the width of the spots in the one-dimensional array, and the temporal positions of the individual pulses are set by the spatial positions of the individual spots.

Figure 5A:
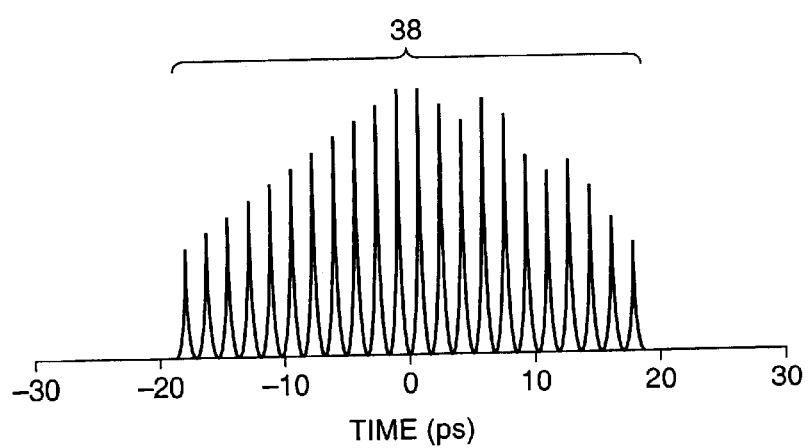
FIG. 5A is a cross-correlation graph of a pulse sequence generated with a pixelation mask consisting of a periodic array of 20 transparent rectangles in accordance with a specific embodiment of the present invention.

An example of the output waveform is shown in FIG. 5A. FIG. 5A is an example of a cross-correlation measurement of the optical pulse sequence generated with a pixelator 18 consisting of various linear arrays of 20 micron transparent rectangles with 62.5 micron center-to-center spacing. FIG. 5A shows that there are twenty uniformly spaced temporal pulses 38. Thus, the number of pulses in the output temporal train 40 simply depends on the time window and the desired pulse spacing. If a longer pulse sequence is desired, the temporal window can be enlarged by expanding the beam on the diffraction grating 16 while simultaneously reducing the width of the slit on the output port 26.

Figure 6A:
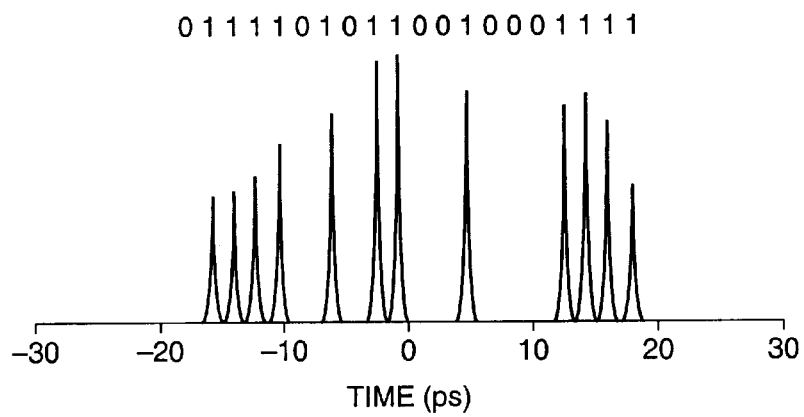
FIGS. 6A and 6B is the measurement of pulse train sequences generated with two different masking patterns to illustrate the parallel to serial conversion capability of the present invention.
Figure 6B:
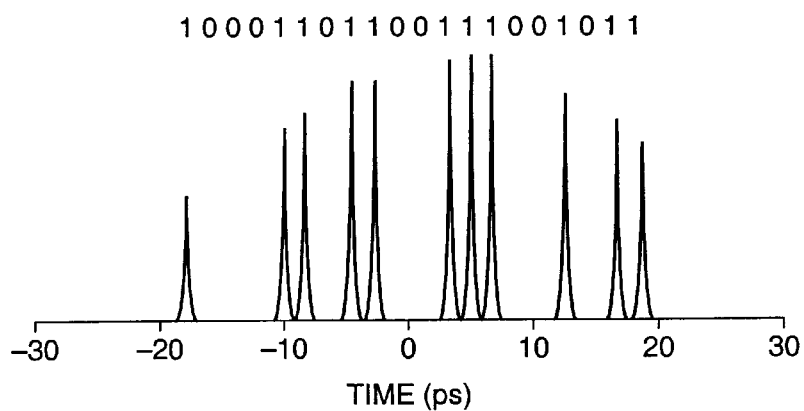

By selecting different masking patterns at the pixelator 18 or at planar modulator 11, optical packets may be generated. Some of the masking patterns may be left opaque to simulate a modulator element being set to the "off" state for that bit. FIGS. 6A and 6B show two examples of optical packets where the sequence of transparent ("on" state) and opaque elements in each masking pattern is indicated ('1' is transparent, '0' is opaque). A flatter top intensity profile in the output temporal train may be achieved by either expanding the beam prior to input to the pixelator 18 in order to more closely approximate a uniform spatial profile, or by using a diffractive mask as the pixelator. The use of a diffractive mask would also significantly increase the efficiency of the image formation optics. Diffractive masks (a diffractive optical element or computer generated hologram) are well known in the art. One implementation of the diffractive mask consists of a glass substrate with a relief pattern etched into one surface. One case is a binary relief pattern, with two different possible heights. The height difference is advantageously chosen to be close to one half optical wavelength (i.e., submicron). The details of the spatial pattern are chosen such that propagation of light after passing through the mask results in a desired spatial pattern at a distance far from the diffractive mask. Specific spatial patterns to generate a series of output spots with nearly equal intensities (other output spot patterns are also possible) are known to those skilled in the art.

Pulse Train Generation

In commercial optical networking systems, the individual channels (N total channels per fiber) that make up the data stream are typically generated from N different laser/modulator elements, and then combined onto a single fiber using a N×1 multiplexer. The cost for these source elements is quite high with the cost per channel source elements that has determined the maximum data rate deployed in commercial systems. This invention permits the hybrid TDM/WDM pulse trains to be generated using a single source laser and a modified commercial channel filter component. Using a single source laser rather than N lasers will allow commercial network vendors to construct systems with drastically increased data rates for little to no increase in component cost. As further discussed below, this invention provides for the generation of pulse trains with the DST pulse shaper in bulk-optics or with integrated optics such as an AWG.

Thus, one aspect of the present invention is the ability to generate trains of pulses, or pulse sequences, where the state of each pulse in the train, either 'on' or 'off', is programmed by the optical transmission state at a specific spatial location on the planar modulator 11. FIG. 5A corresponds to an output from a planar modulator having 20 transparent rectangles 20 micron wide with 62.5 micron center-to-center spacing in one implementation of the invention. As shown in FIG. 5A, a train of 20 pulses was generated.

Figure 5B:
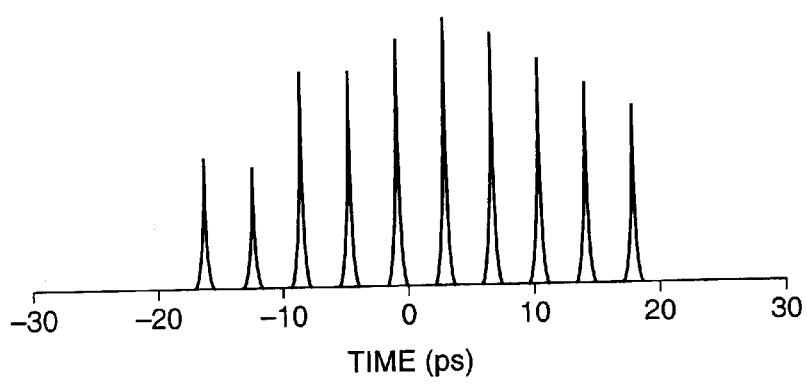
FIG. 5B is a cross-correlation graph of a pulse sequence generated with a pixelation mask consisting of a periodic array of 10 transparent rectangles in accordance with a specific embodiment of the present invention.

FIG. 5B corresponds to an output from the same planar modulator as in FIG. 5A but with every other transparent spot blocked or turned "off." Thus, as shown in FIG. 5B, the result is a train of ten pulses with twice the period of those in FIG. 5A.

This aspect of the DST pulse shaper allows for the conversion of parallel electronic bits as in a word of computer data to a serial data stream of light. FIGS. 6A and 6B are illustrative of this feature. In FIGS. 6A and 6B the binary data shown above the intensity plot correspond to the resulting pulse train generated in response to that binary data.

Another feather of this invention is that the output intensity profile is invariant across the output channels as shown in FIG. 8. The general shape of the power spectra remains the same from one output to another; however, the center wavelength shifts across the output guides.

Two major components of an optical pulse train generator are a short pulse laser, and a filter element such as an arrayed waveguide grating ("AWG") as shown in FIGS. 9. One use of the AWG is to separate the wavelength channels on the source fiber so that each channel may be manipulated independently. In this case, the AWG works as a 1×N splitter where the input signal is split into N separate outputs—the center wavelength, or frequency, and channel width of each output channel is determined by the filter response of the AWG. So that a single center wavelength is present on each output channel, the free spectral range of these devices is generally designed to be as large as possible and even perhaps larger than the gain widow of the fiber amplifiers used in the system.

In order to construct the optical pulse train generator, the AWG structure must be modified to have a small free spectral range which is the inverse of the delay increment per guide in the array guide section of the AWG. FIGS. 11A–D show output temporal profiles from two different AWG structures measured by intensity cross correlation. The output is a train of pulses where the pulse repetition period is equal to the delay increment per guide in the array waveguide section of the AWG which is 1 ps in the devices. The difference between FIGS. 11A–D is that 11A and 11C correspond to a device with an output channel spacing of 100 GHz while 11B and 11D is for a 40 GHz channel spacing.

Another feather of this invention, similar to the feature in the bulk-optics described above, is that the output intensity profile is invariant across the output channels as shown in FIG. 11. The general shape of the power spectra remains the same from one output to another; however, the center wavelength shifts across the output guides. The end result is multiple high repetition rate trains of pulses with identical intensity profiles can be generated at varying center wavelengths using a single source laser, and the modified AWG structure. Thus, FIG. 11 indicates that 25 Tbits/s split across 25 channels or even higher speeds and channel counts are possible with a modified AWG.

Chirp Compensation

As shown above, the DST pulse shaper is effective in generating femtosecond pulse sequences. The key characteristic of this geometry is the direct correspondence between the output temporal waveform and spatial features in the pulse shaping mask. This is in contrast to the FT in which there is a FT relationship between the pulse shaping mask and the output temporal profile. Dispersion can be controlled in the FT by varying the longitudinal position of one of the gratings, this is the basis of pulse stretcher commonly used for chirped pulse amplification. However, dispersion is treated differently in this invention.

One such way to control dispersion or eliminate the chirp is to utilize a telescopic configuration to relay the spatially patterned beam onto the spectral disperser such as a curved phase front. However, the telescopic configuration would have to be precisely positioned and the beam would have to be perfectly focused. These strict restrictions may be undesirable in some cases such as when there is a need for the flexibility to control the output waveform to obtain a certain output.

Another way to control chirp is to change a first distance 13, $d_1$, between the spectral disperser 16 (FIG. 1A) and the lens 24, a second distance 15, $d_2$, between the lens 24 and the output port 26, or both. By changing the first distance 13 or second distance 15, or both, chirp can be controlled and/or eliminated. The physics behind chirp will be used to explain this feature.

The spectral amplitude of the field of the beam just after the spectral disperser is:

$$E_2(x,\omega) \; s(\beta x)exp[-j\gamma\omega x]E_{in}(\omega) \qquad (10)$$

The field before the pulse shaping lens is:

$$E_3(x, \omega) \propto \int_{-\infty}^{\infty} dx_2 E_2(x_2, \omega) \exp\left[\frac{jk}{2d_1}x_2^2\right]\exp\left[\frac{-jk}{d_1}x_2 x\right] \qquad (11)$$

When the effect of the lens and output-slit is included, the end result is:

$$e_{out}(t) \; e_{in}(t) * \{N(t)exp[-j\phi(t)]\} \qquad (12)$$

where $$N(t) = m\left(\frac{-\beta t}{\gamma}\right)\exp\left[\frac{-\beta^2 t^2}{\gamma^2 w^2}\right] \qquad (13)$$

determines the temporal intensity profile of the output, and $$\phi(t) = \frac{k}{2\gamma^2}\left(\frac{\beta^2}{R} - \frac{d_2 - f}{d_1 f + d_2 f - d_1 d_2}\right)t^2 \qquad (14)$$

gives the quadratic temporal phase and hence the chirp where R is the radius of curvature of the spatial beam at the spectral disperser. The output chirp can be manipulated (in a special case compensated or set to zero) by varying $d_1$ and $d_2$. The output chirp may also be manipulated by varying the spatial radius of curvature R. The intensity profile and space-to-time conversion constant remains invariant as the chirp is manipulated in this way.

It is important to control or eliminate chirp since it can cause distorted pulse outputs which may cause undesired spreading or dispreading of pulse packets. If extreme, pulses may overlap and lose synchronization resulting in a loss of data. Thus, in high speed optical networking systems utilizing short pulses, control of chirp is important. If not properly controlled or compensated, chirp will limit the transmission distance of high-speed optical data telecommunications network and may cause a loss of data.

Multiple Wavelength Output

In all discussions above, it was assumed that the output port 26 had a slit that was infinitely thin and centered around x=0. However, this ideal is not practical or desirable since the transmitted power would be zero. In practice, the slit should be thin enough so that it is smaller than the focused spot size of the dispersed frequency components. As long as this condition is met, the delta-function approximation is a reasonable one. However, as the pulse shaping slit is made wider, the temporal window is thereby reduced, and the output beam become inhomogeneous. Using equation (7), placing the pulse shaping slit at $x=x_s$ does not modify the output intensity profile, rather the output center wavelength is shifted. Thus, transverse displacements of the pulse shaping slit shifts the center wavelength of the apparatus output, but the intensity profile remains unchanged.

To explain this feature mathematically, the complex spectrum just prior to the output slit(s) is:

$$E_3(x, \omega) \propto S\left(\frac{2\pi x}{\beta \lambda f} - \frac{\gamma \omega}{\beta}\right) E_{in}(\omega) \tag{15}$$

Consider now a thin slit at lateral position, $x_s$. The filtered spectrum now has the form:

$$E_4(x, \omega) \propto S\left(\frac{2\pi x}{\beta \lambda f} - \frac{\gamma \omega}{\beta}\right) E_{in}(\omega) \delta(x - x_s) \tag{16}$$

Eqn. (16) shows that a transverse movement of the output slit leads to a simple shift in the spectral response function of the DST pulse shaper.

The time domain response corresponding to Eqn.(16) is given by $$e_{out}(t) \propto e_{in}(t) * \left\{ s\left(\frac{-\beta t}{\gamma}\right) \exp\left(\frac{j 2\pi x_s}{\gamma \lambda f} t\right) \right\} \tag{17}$$

The impulse response function is given by the terms inside the { . . . } sign and consists of two terms. The first, $s(-\beta t/\gamma)$, represents the space-to-time conversion constant and is unchanged. The second, linear phase term represents a frequency shift. Thus, a lateral movement of the output slit tunes the output optical frequency while leaving the intensity profile of the shaped output waveform unaffected.

We can also consider a multiple output slit element which spatially separates each output beam in a non-overlapping manner. The output from each independent slit is still given by equations (16) and (17), with the appropriate slit position inserted for $x_s$. Thus, the DST pulse shaper is able to simultaneously generate multiple spatially separated, wavelength shifted outputs, each with the identical intensity profile. In cases where such multiple outputs are useful, this increases the overall optical efficiency by a factor equal to the number of outputs.

Figure 7:
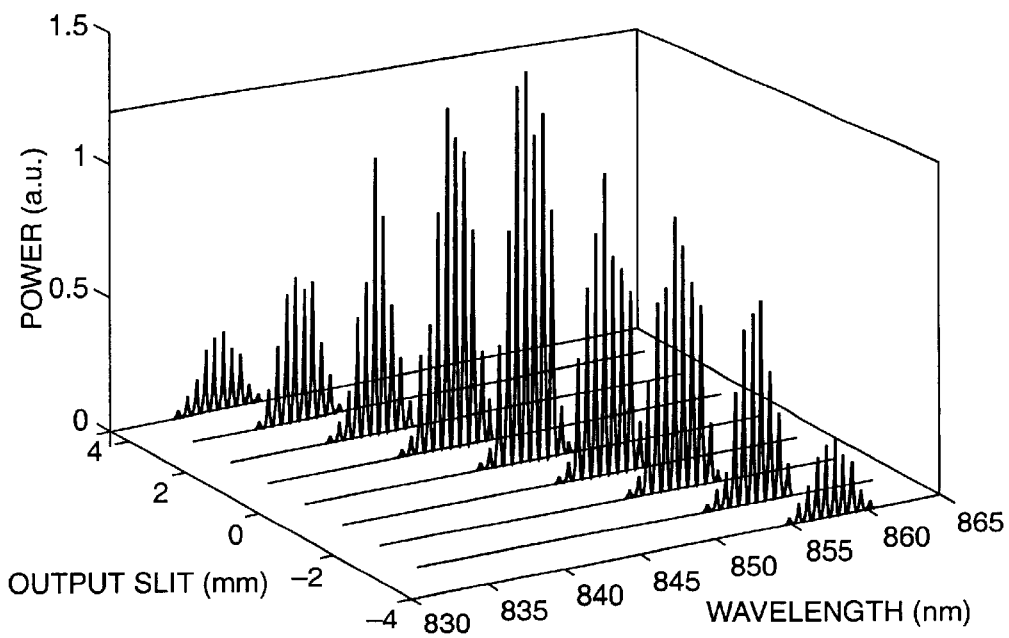
FIG. 7 is a series of output spectra in accordance with a specific embodiment of the present invention measured for different transverse positions (y-axis) of the output slit.
Figure 8A:
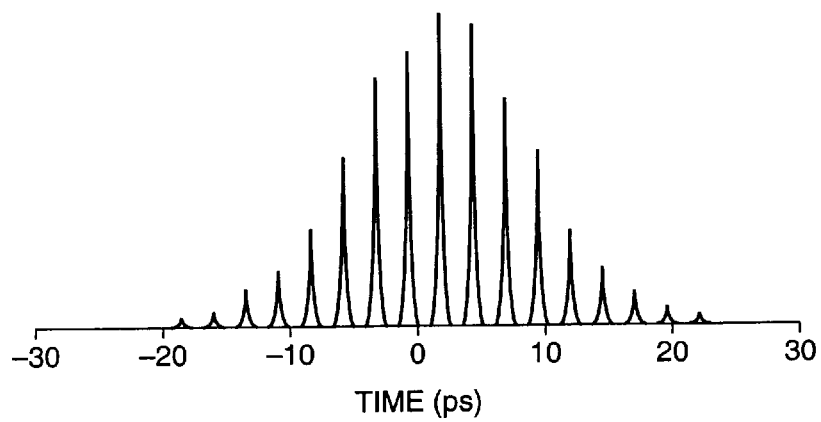
FIGS. 8A–D are intensity cross-correlation graphs for two different transverse positions of the pulse-shaping slit.
Figure 8B:
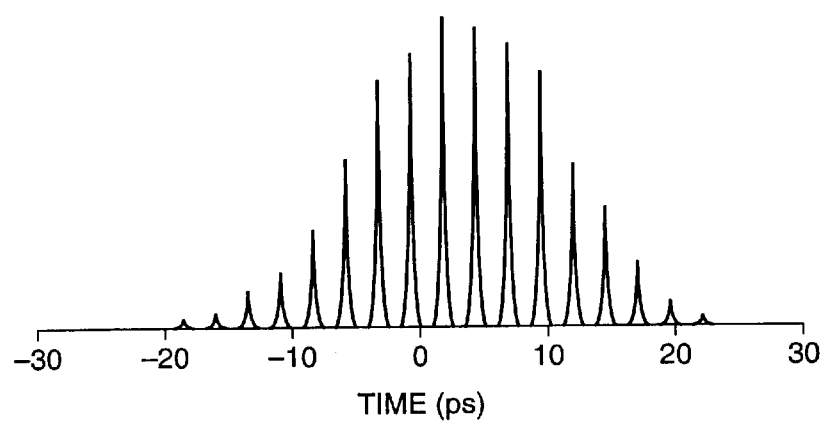
Figure 8C:
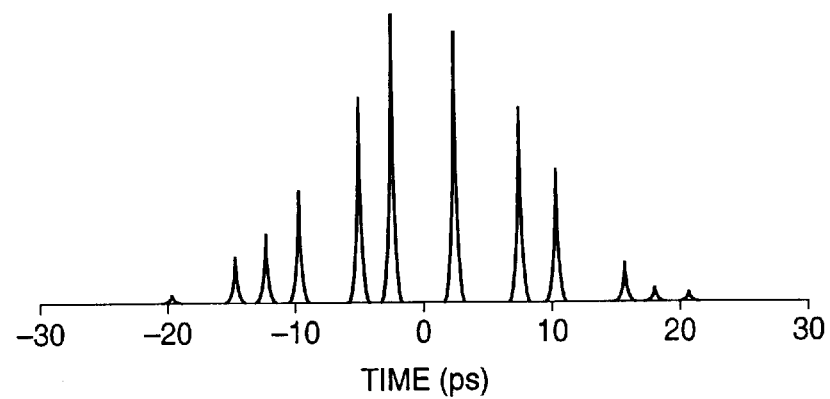
Figure 8D:
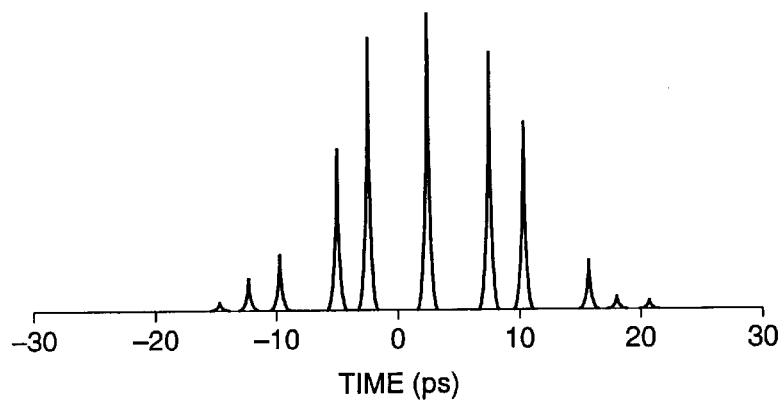

FIG. 7 shows a series of output spectra measured for different transverse positions of the output slit. Each spectrum consists of a series of spectral peaks, which is expected for an output waveform consisting of a series of evenly spaced pulses. The center wavelength of each spectrum exhibits a clear shift as a function of slit position, however, the shape of the spectrum does not change as the slit is moved. FIGS. 8A–8D illustrate temporal output profiles for two different transverse positions of the output port slit. FIGS. 8A and 8C shows the slit at −1 mm and FIGS. 8B and 8D shows the slit at +1 mm. FIGS. 8A and 8B demonstrate period pulse trains whereas FIGS. 8C and 8D demonstrate pulse packet masking functions. FIGS. 8A–8D show that the output intensity profile is invariant with a transverse displacement of the pulse shaping slit. Thus, the center wavelength of the output may be shifted in this way without changing the output intensity profile.

Integrated Configuration

Some or all of the optical elements in the DST pulse shaper maybe implemented using integrated optics technology. This offers significant advantages in communications and high performance computing systems. In high performance computing systems, combining output data words from fast electrical interfaces and serializing them for transfer over an ultrafast optical channel to other high performance systems is a key application. Moreover, it will permit hybrid TDM/WDM pulse trains to be generated using a single source laser and a modified commercial channel filter component. Using a single source laser rather than a plurality of lasers will allow commercial network vendors to construct systems with drastically increased data rates for little to no increase in component cost. The embodiment discussed in this section utilizes an arrayed waveguide grating (AWG) which has been developed for wavelength demultiplexing and routing in WDM optical networks. However, those skilled in the art will realize that other integrated optic spectral dispersers may be utilized to achieve the same or similar results.

One implementation of an integrated optic spectral disperser comprises waveguide arrays and slab waveguides fabricated in films of silica glass which may be deposited on top of a silicon substrate. Both the slab waveguide and the waveguides in the array may include a thin layer in which the silica is doped to have increased refractive index to confine light in the vertical direction, i.e., the direction normal to the surface of the film. In addition, an etching process may be used (for example) to define the individual waveguides in the array by removing a few tenths to a few microns of material adjacent to the guiding regions. This confines light in one transverse direction so that light is only free to propagate in one direction within each individual guide. Typically the waveguide dimensions are a few microns in the vertical direction, and in the case of individual guides defined in the array region, a few microns in one transverse dimension. Typically the length of each guide in the array section is on the order of a fraction of a centimeter to several centimeters.

Figure 9A:
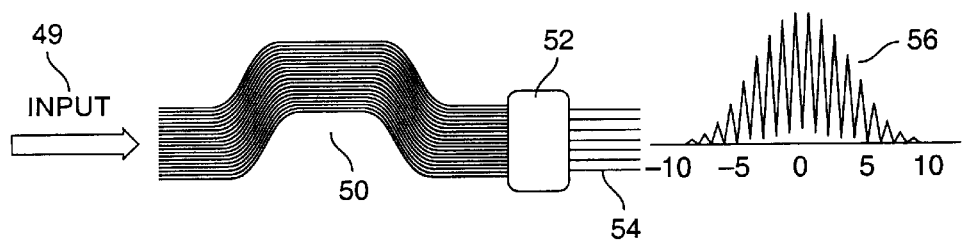
FIG. 9A is diagram of the modified arrayed waveguide grating.

In a first embodiment, the pulse shaping optics in the DST pulse shaper of FIG. 1A is replaced with the modified AWG as shown in FIG. 9A. The spatially patterned pulse beam 49 is incident into the waveguide array 50. The waveguide array includes a series of waveguides, where the length of the guides increases along the array, typically with a constant length increment from one guide to the next. At the output of the array waveguide, the closely spaced set of guides acts as a spectral disperser. The output surface of the array waveguide is usually curved, which acts as a focusing element. Thus, the arrayed waveguide acts as a curved diffraction grating, equivalent to the spectral disperser and focusing element in the DST pulse shaper of FIG. 1A. The beam is then directed through an output slab waveguide 52 and to the output waveguide or waveguide array 54 thereby producing the output waveforms 56. Each output waveform 56 has a temporal profile that is a direct-scaled representation of the spatial profile present at the input 49. In this embodiment, generating a spatial pattern at the input 49 is equivalent to generating a spatial pattern on the spectral disperser. The N output waveguides 54 act as N distinct output slits. As discussed above, this allows each to have a different center wavelength while the intensity profile remains the same.

Figure 9B:
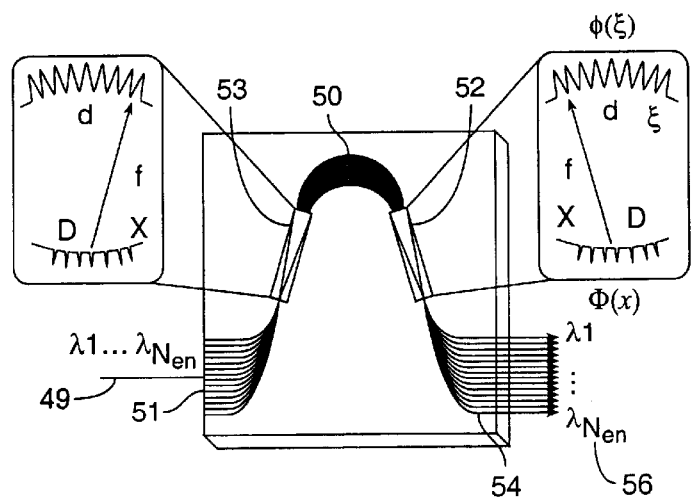
FIG. 9B is a diagram of the standard arrayed waveguide grating.
Figure 9C:
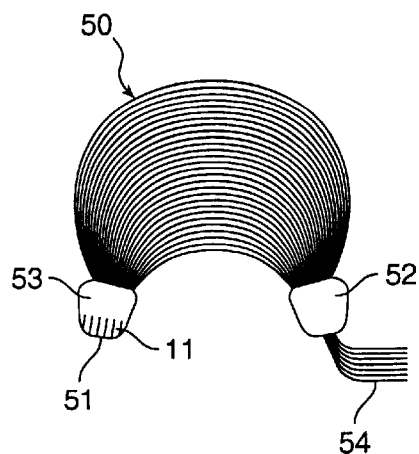
FIG. 9C is a diagram of yet another modified arrayed waveguide grating having a diffractive optical element.

In another embodiment, a standard AWG used in WDM optical networks may be utilized, as shown in FIG. 9B. A pulsed beam 49 is guided through an input guide 51 to an input slab waveguide 53 which disperses the beam onto the waveguide array 50. In this embodiment, the input surface of the waveguide array is usually curved, as well as the output surface. As shown in FIG. 9B, the remaining parts are similar to the modified AWG discussed above. In yet another embodiment as shown in FIG. 9C, a spatial patterning element 17 may be placed after the input guide 51. It is preferable to use a diffractive mask as the spatial patterning element 17 in this embodiment. The AWG used in this invention is used with a temporally pulsed light beam as well as a modified choice of free spectral range. The free spectral range in this invention is less than the bandwidth of the input pulsed light beam.

Figure 10:
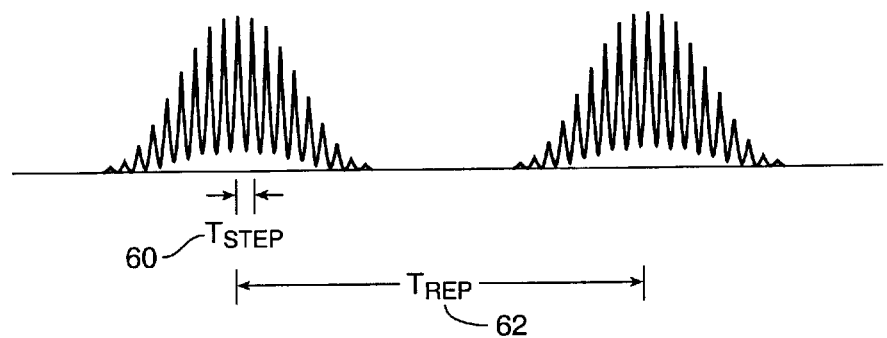
FIG. 10 is a diagram of an output train from delayed input pulse beams in accordance with a specific embodiment of the present invention.
Figure 11A:
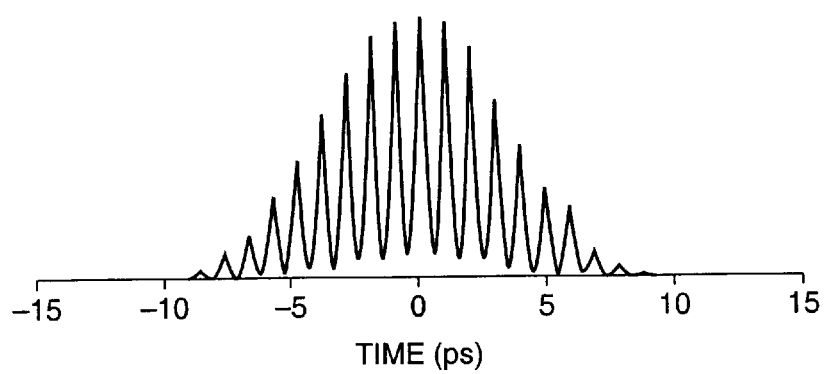
FIGS. 11A and 11B are a train of pulses separated by 1 psec within an approximately 10 ps total time interval.
Figure 11B:
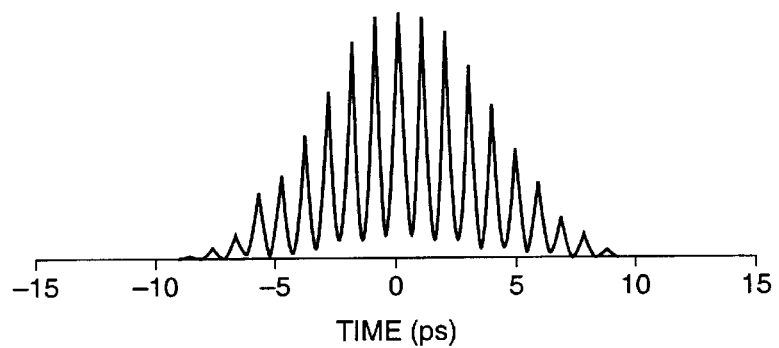
Figure 11C:
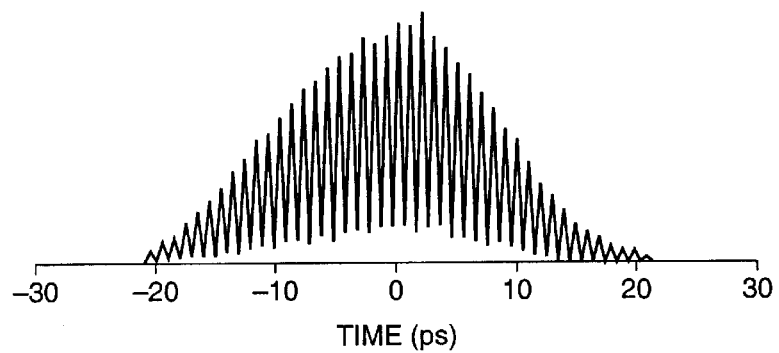
FIGS. 11C and 11D are a train of pulses separated by 1 psec within an approximately 25 ps total time interval.
Figure 11D:
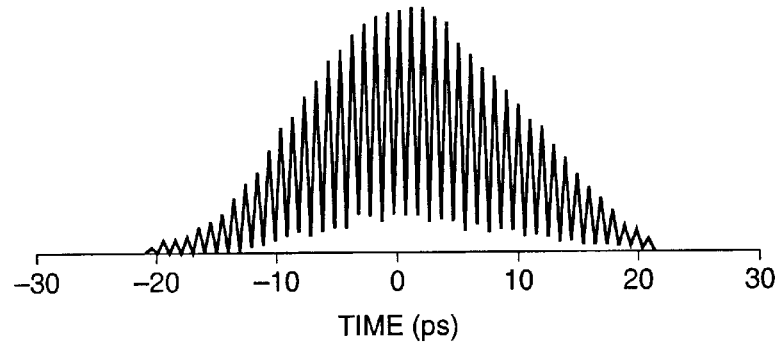

There are many aspects to utilizing the integrated optic spectral disperser. One aspect is the ability to pulse the beam at any time interval desired as shown in FIG. 10. The DST pulse shaper is designed with the modified AWG to allow its free spectral range ("FSR") to be less than the bandwidth of the input pulse. The output of the AWG is then a pulse train burst with the pulse separation, $T_{step}$ 60, within the burst determined by the delay increment per guide in the waveguide array. The pulse bursts repeat at the repetition period of the source laser, $T_{rep}$ 62, and demonstrate identical temporal intensity profiles, but varying the center wavelength from each spatially separated output guide. Thus, as shown in FIGS. 11A–D, the output intensity profile is invariant across the output channels. FIGS. 11A and 11B show the cross-correlations of two output channels from a first AWG device designed to produce a pulse train within a time interval of about 10 psec, whereas FIGS. 11C and 11D show the cross-correlations for the same two output channels from a second AWG device designed to produce a pulse train within a time interval of about 25 psec. This shows that different pulse trains within different time intervals can be generated by controlling the AWG device design. Also, for a single AWG device, this allows for the generation of multiple high repetition rate trains of pulses with identical intensity profiles at varying center wavelengths using a single source laser.

Figure 12:
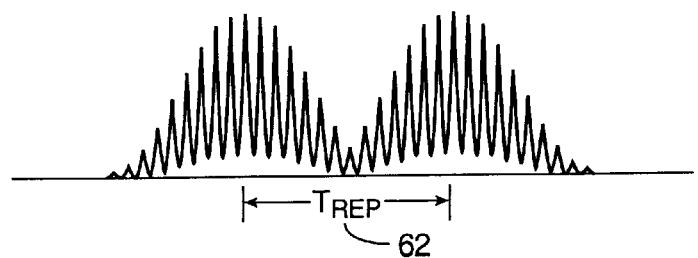
FIG. 12 is a diagram of merging pulse trains in accordance with a specific embodiment of the present invention.

Still another aspect allows laser pulses to occur closer together with the laser repetition period approaching $N*T_{step}$, as shown in FIG. 12, where N is the number of pulses in the pulse burst. In this embodiment, there is no dead space between the pulse trains. The pulse bursts merge to form a continuous, or quasi-continuous high repetition rate pulse train. This is achieved by reducing $T_{rep}$ 62 to $T_{rep} \leq NT_{step}$ and locking $T_{rep}$ 62 to be an integer multiple of $T_{step}$ 60.

Figure 13:
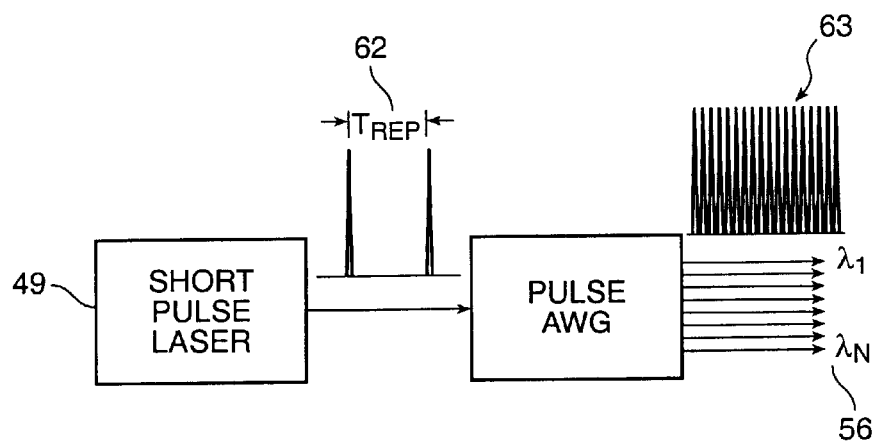
FIG. 13 is a diagram of an output train showing the flat pulse train capability in accordance with a specific embodiment of the present invention.

In all aspects above, the output pulse trains generated each had a smooth spatial distribution function with the strongest intensity in the center. However, if one does not want to have an output pulse with a smooth shape, but rather a flat pulse train 63, then the intensity must be the same in every guide. Thus, another aspect provides for flat pulse trains 63 as shown in FIG. 13. This result may be achieved in several ways. One way to achieve this result is to tailor the waveguide loss in the waveguide array on a guide-to-guide basis using a fixed waveguide loss. In other words, introduce more loss in the center guide thereby tapering out less loss in the outer guides to equalize the intensities of the N guides. The output waveform is thus a burst of N equal intensity pulses. General amplitude modulation is also possible on a guide-by guide basis within the waveguide array by using an amplitude modulator in the waveguide array. As an example, the loss in certain selected guides can be made very high, which means that the corresponding pulses in the time domain output pulse train are turned off. This feature is useful in generating a modulated data packet. This feature is also useful in that it can be used for noise control as well as error detection.

Use of a diffractive mask within the first slab region of the AWG may also result in a flat pulse train or other modified pulse sequence pattern. The diffractive mask leads to a spatially patterned spatial profile at the input of the waveguide array section, with the spatial pattern determined by the design of the diffractive mask. The diffractive mask is a phase-only device and therefore has the advantage of a lower loss than using the fixed waveguide loss. For the flat pulse train application, the design of the diffractive mask must be chosen to give a square array of spatial spots at the input to the array waveguide region, one spot per each of N guides the user wants to couple.

Another aspect of this integrated configuration is the ability to allow for phase modulation within the AWG to either (a) control the phase of individual output pulses, or (b) for a given pulse train profile, to control the passband shape using a phase modulator in the array waveguide. Moreover, the amplitude of the output waveforms may be varied using either a fixed amplitude and/or phase functions, or an internal modulator or modulator array within the array waveguide. Fixed amplitude modulation can be implemented by inserting additional loss into the waveguide array on a guide-by-guide basis, or by offsetting the waveguide position away from its ideal design location. The fixed phase modulation can be implemented by applying small length changes to the guides in the waveguide array away from the ideal design condition of a fixed constant length difference between adjacent guides. A fixed attenuator may also be placed within waveguide array to attenuate the output waveform.

While embodiments, examples, and applications of this invention are shown and described, it would be apparent to those of ordinary skill in the art having the benefit of this disclosure that many more modifications than mentioned above are possible without departing from the inventive concepts herein. Thus, what has been disclosed is merely illustrative of the present invention and other arrangements or methods can be implemented by the those skilled in the art without departing from the spirit and scope of the present invention.

What is claimed is:

1. An optical transmitter, comprising:
   an input port receiving a pulsed light beam;
   a planar modulator coupled to said input port to spatially pattern the beam;
   a spectral disperser receiving the patterned beam to spectrally disperse and direct the patterned beam, wherein said spectral disperser includes an integrated optic spectral disperser comprising a waveguide array coupled to a slab waveguide at a first end;
   a focus element receiving the dispersed beam and producing a focused beam; and an output port having an aperture positioned to receive a portion of the focused beam.

2. The apparatus of claim 1 further comprising a pixelator disposed in an optical path between said input port and said planar modulator.

3. The apparatus of claim 1 wherein said planar modulator includes at least one fixed transmission mask.

4. The apparatus of claim 1 wherein said planar modulator includes at least one fixed reflection mask.

5. The apparatus of claim 1 wherein said planar modulator includes at least one spatial light modulator.

6. The apparatus of claim 5 wherein said spatial light modulator is a transmission modulator.

7. The apparatus of claim 5 wherein said spatial light modulator is a reflection modulator.

8. The apparatus of claim 1 wherein said planar modulator includes at least one hologram.

9. The apparatus of claim 1 wherein said planar modulator includes at least one diffractive mask.

10. The apparatus of claim 1 further comprising at least one amplitude modulator disposed in said waveguide array.

11. The apparatus of claim 1 further comprising at least one fixed attenuator disposed in said waveguide array.

12. The apparatus of claim 1 further comprising at least one phase modulator disposed in said waveguide array.

13. The apparatus of claim 1 further comprising at least one device imposing a fixed phase difference, between said input and said output beams, said device disposed in said waveguide array.

14. The apparatus of claim 1 wherein said aperture is in the shape of a slit.

15. The apparatus of claim 1 wherein said aperture is coupled to an optical fiber.

16. The apparatus of claim 1 wherein said slab waveguide further comprises at least one slit disposed at a second end thereof.

17. The apparatus of claim 1 wherein said slab waveguide further comprises at least one optical fiber disposed at a second end thereof.

18. The apparatus of claim 1 wherein said slab waveguide further comprises at least one output waveguide disposed at a second end thereof.

19. The apparatus of claim 1 wherein said focus element comprises a lens.

20. The apparatus of claim 1 wherein said focus element comprises a curved mirror.

21. The apparatus of claim 1 wherein said focus element comprises a curved portion of said spectral disperser.

22. A system for generating an optical transmission, comprising:
    an input port receiving a pulsed light beam;
    means for imposing a spatial pattern onto said pulsed light beam with a planar modulator;
    means for projecting said pulsed light beam onto a spectral disperser;
    means for focusing said pulsed light beam and directing it to an output port, said output port having an aperture to receive a portion of said focused beam; and
    a means for controlling chirp.

23. The system of claim 22 wherein said means for controlling chirp further comprises varying a first distance between said spectral disperser and said means for focusing.

24. The system of claim 22 wherein said means for controlling chirp further comprises varying a second distance substantially between said means for focusing and said output port.

25. The system of claim 22 wherein said means for controlling chirp further comprises inserting a curved phase front on said pulsed light beam at said spectral disperser.

26. An apparatus for generating an optical transmission, comprising:
    means for imposing a spatial pattern onto a pulsed light beam;
    means for projecting said pulsed light beam on to a spectral disperser;
    means for focusing said pulsed light beam onto an apertured output port;
    means for creating an output waveform; and
    means for transversely changing the position of said aperture to change a center wavelength of said pulsed light beam.

27. An optical transmitter, comprising:
    an input port receiving a pulsed light beam;
    a planar modulator coupled to said input port to spatially pattern said pulsed light beam; and
    a spectral disperser to direct said patterned beam to an output port, wherein said spectral disperser includes an integrated optic spectral disperser comprising a waveguide array coupled to a slab waveguide at a first end.

28. The apparatus of claim 27 further comprising a pixelator disposed in an optical path between said input port and said planar modulator.

29. The apparatus of claim 27 wherein said planar modulator includes at least one fixed transmission mask.

30. The apparatus of claim 27 wherein said planar modulator includes at least one fixed reflection mask.

31. The apparatus of claim 27 wherein said planar modulator includes at least one spatial light modulator.

32. The apparatus of claim 31 wherein said spatial light modulator is a transmission modulator.

33. The apparatus of claim 31 wherein said spatial light modulator is a reflection modulator.

34. The apparatus of claim 27 wherein said planar modulator includes at least one hologram.

35. The apparatus of claim 27 wherein said planar modulator includes at least one diffractive mask.

36. The apparatus of claim 27 wherein said spectral disperser includes an integrated optic spectral disperser.

37. The apparatus of claim 36 wherein said integrated optical spectral disperser comprises a waveguide array coupled to a slab waveguide at a first end.

38. The apparatus of claim 27 further comprising at least one amplitude modulator disposed in said waveguide array.

39. The apparatus of claim 27 further comprising at least one fixed attenuator disposed in said waveguide array.

40. The apparatus of claim 27 further comprising at least one phase modulator disposed in said waveguide array.

41. The apparatus of claim 27 further comprising at least one device imposing a fixed phase difference, between said input and said output beams, said device disposed in said waveguide array.

42. The apparatus of claim 27 wherein said aperture is in the shape of a slit.

43. The apparatus of claim 27 wherein said aperture is coupled to an optical fiber.

44. The apparatus of claim 27 wherein said slab waveguide further comprises at least one slit disposed at a second end thereof.

45. The apparatus of claim 27 wherein said slab waveguide further comprises at least one optical fiber disposed at a second end thereof.

46. The apparatus of claim 27 wherein said slab waveguide further comprises at least one output waveguide disposed at a second end thereof.

47. A method for generating an optical transmission, comprising:
 imposing a spatial pattern on a pulsed light beam;
 spectrally dispersing said pulsed light beam;
 focusing said dispersed pulsed light beam onto an output port;
 spatially selecting a portion of said pulsed light beam with at least one optical waveguide in said output port; and
 transversely changing the position of said output waveguide thereby changing a center wavelength of said pulsed light beam.

48. The method of claim 47 wherein output waveguide is an optical fiber.

49. An optical transmitter, comprising:
 at least one input port receiving a pulsed light beam having a bandwidth;
 an input slab waveguide coupled to said input port to direct said pulsed light beam to a spectral disperser having a free spectral range;
 an output slab waveguide coupled to said spectral disperser at a first end; and
 at least one output waveguide coupled to said output slab at a second end.

50. The apparatus of claim 49 wherein said spectral disperser comprises a waveguide array.

51. The apparatus of claim 50 wherein said waveguide array includes at least one amplitude modulator.

52. The apparatus of claim 50 wherein said waveguide array includes at least one phase modulator.

53. The apparatus of claim 50 wherein said waveguide array includes at least one fixed waveguide loss.

54. The apparatus of claim 50 further comprising at least one device imposing a fixed phase difference, between said input and said output beams, said device disposed in said waveguide array.

55. The apparatus of claim 49 wherein said free spectral range is less than said bandwidth.

56. The apparatus of claim 49 wherein said output slab comprises at least one output slit at said second end.

57. The apparatus of claim 49 wherein said output slab is coupled to at least one optical fiber at said second end.

58. The apparatus of claim 49 wherein said output waveguide includes at least one optical fiber.

59. A method for generating an optical transmission, comprising:
 imposing a spatial pattern on a pulsed light beam;
 spectrally dispersing said pulsed light beam; and
 focusing said dispersed pulsed light beam onto an output port,
 wherein said dispersing is accomplished with an integrated optic spectral dispersing element comprising a waveguide array.

60. The method of claim 59 wherein said imposing further comprises:
 pixelating said pulsed light beam; and
 aligning said pixelated pulsed light beam onto a planar modulator so that pixels of said beam align with individual modulator elements of said planar modulator.

61. The method of claim 59 further comprising changing the amplitude of said pulsed light beam with at least one amplitude modulator in said waveguide array.

62. The method of claim 59 further comprising fixing a phase difference between a plurality of waveguide elements in said waveguide array.

63. The method of claim 59 wherein said focusing is accomplished with a curved portion of a spectral dispersing element.

64. The method of claim 59 further comprising changing the phase of said pulsed light beam with a phase modulator in said waveguide array.

65. The method of claim 59 further comprising fixing a waveguide loss in said pulsed light beam with at least one fixed waveguide loss in said waveguide array.

66. The method of claim 59 further comprising spatially selecting a portion of said pulsed light beam with at least one output slit in said output port.

67. The method of claim 59 further comprising spatially selecting a portion of said pulsed light beam with at least one optical fiber in said output port.

68. The method of claim 59 further comprising spatially selecting a portion of said pulsed light beam with at least one output waveguide in said output port.

69. A method for generating an optical transmission, comprising:
 imposing a spatial pattern on a pulsed light beam;
 spectrally dispersing said pulsed light beam;
 focusing said dispersed pulsed light beam onto an output port;
 spatially selecting a portion of said pulsed light beam with at least one output aperture in said output port; and
 transversely changing the position of said output aperture thereby changing a center wavelength of said pulsed light beam.

70. The method of claim 69 wherein said output aperture is an output slit.

71. A method for generating an optical transmission, comprising:
 imposing a spatial pattern on a pulsed light beam;
 spectrally dispersing said pulsed light beam;
 focusing said dispersed pulsed light beam onto an output port; and
 controlling a chirp.

72. The method of claim 71 wherein said controlling a chirp comprises changing a first distance between a spectral dispersion element and a focusing element.

73. The method of claim 71 wherein said controlling a chirp comprises changing a second distance between a focusing element and said output port.

74. The method of claim 71 wherein said controlling a chirp comprises changing the phase of said pulsed light beam with at least one phase modulator in said waveguide array.

75. The method of claim 71 wherein said controlling a chirp comprises inserting a curved phase front on said pulsed light beam at a spectral dispersion element.

76. An apparatus for generating an optical transmission, comprising:
 means for imposing a spatial pattern onto a pulsed light beam;
 means for projecting said pulsed light beam onto a spectral disperser;
 means for focusing said pulsed light beam onto an apertured output port; and
 means for creating an output waveform,
  wherein the spectral disperser is an integrated optic spectral dispersing element comprising a waveguide array.

77. The apparatus of claim 76 wherein said aperture is at least one slit.

78. The apparatus of claim 76 further comprising means for coupling said aperture to an optical fiber.

79. The apparatus of claim 76 wherein said means for imposing comprises:
means for pixelating said pulsed light beam;
means for focusing said pixelated beam through a first lens;
means for redirecting said pixelated beam with a pulsed light beam splitter;
means for changing the polarization of said pixelated beam through a quarter waveplate; and
means for matching said pixelated beam onto a planar modulator.

80. The apparatus of claim 76 wherein said means for projecting comprises:
means for changing the polarization of said pixelated beam through a quarter waveplate; and
means for focusing said pixelated beam through a second lens.

81. The apparatus of claim 76 wherein said means for focusing includes a lens.

82. The apparatus of claim 76 wherein said means for focusing includes a curved mirror.

83. The apparatus of claim 76 further comprising means for changing the amplitude of said pulsed light beam with at least one amplitude modulator in said waveguide array.

84. The apparatus of claim 76 further comprising means for fixing a phase difference between a plurality of waveguide elements in said waveguide array.

85. The apparatus of claim 76 further comprising means for changing the phase of the beam with at least one phase modulator in said waveguide array.

86. The apparatus of claim 76 further comprising means for fixing a waveguide loss with at least one fixed waveguide loss in said waveguide array.

87. An apparatus for generating an optical transmission, comprising:
means for imposing a spatial pattern onto a pulsed light beam;
means for projecting said pulsed light beam onto a spectral disperser;
means for focusing said pulsed light beam onto an apertured output port;
means for creating an output waveform; and
means for controlling chirp.

88. The apparatus of claim 87 wherein said means for controlling chirp includes varying a first distance between a spectral dispersion element and a focusing element.

89. The apparatus of claim 87 wherein said means for controlling chirp includes varying a second distance between a focusing element and said output port.

90. The apparatus of claim 87 wherein said means for controlling chirp includes forming a curved phase front on said pulsed light beam at a spectral dispersion element.

91. A method for generating an optical transmission, comprising:
inputting a pulsed light beam to an input slab waveguide;
spreading said pulsed light beam onto an integrated optical spectral disperser having a waveguide array;
inputting said pulsed light beam into an output slab waveguide at a first end, said output slab waveguide having a length distance; and
sending said pulsed light beam through at least one output waveguide.

92. The method of claim 91 further comprising fixing a waveguide loss with at least one fixed waveguide loss in said waveguide array.

93. The method of claim 91 further comprising imposing a spatial pattern on said pulsed light beam.

94. The method of claim 93 wherein imposing said spatial pattern comprises placing a modulator in said input slab waveguide.

95. The method of claim 93 wherein imposing said spatial pattern comprises placing a diffractive mask in said input slab waveguide.

96. The method of claim 93 wherein imposing a spatial pattern further comprises placing a planar modulator in said waveguide array.

97. The method of claim 91 further comprising spatially selecting a portion of said pulsed light beam with at least one slit on said output waveguide at a second end.

98. The method of claim 91 further comprising spatially selecting a portion of said pulsed light beam with at least one optical fiber on said output waveguide at a second end.

99. The method of claim 91 further comprising controlling chirp.

100. The method of claim 99 wherein said controlling chirp further comprises changing said length distance.

101. The method of claim 99 wherein said controlling chirp further comprises forming a curved phase front on said pulsed light beam at said spectral disperser.

102. The method of claim 99 further comprising varying the position of said output waveguide thereby changing a center wavelength of said pulsed light beam.

103. The method of claim 91 further comprising pulsing said pulsed light beam so as to form pulses of temporal width of 100 fs or less having a bandwidth.

104. The method of claim 91 further comprising changing the phase of said pulsed light beam with at least one phase modulator in said waveguide array.

105. The method of claim 91 further comprising changing the amplitude of said pulsed light beam with at least one amplitude modulator in said waveguide array.

106. The method of claim 91 further comprising fixing a phase difference between a plurality of waveguide elements in said waveguide array.

107. A system for generating an optical transmission, comprising:
an input port receiving a pulsed light beam;
means for imposing a spatial pattern onto said pulsed light beam with a planar modulator;
means for projecting said pulsed light beam onto a spectral disperser, wherein said spectral disperser includes an integrated optic spectral disperser comprising a waveguide array coupled to a slab waveguide at a first end; and
means for focusing said pulsed light beam and directing it to an output port, said output port having, an aperture to receive a portion of said focused beam.

108. The system of claim 107 further comprising means for pixelating said pulsed light beam before imposing said spatial pattern.

109. The system of claim 107 wherein said means for imposing further comprises:
means for pixelating said pulsed light beam;
means for focusing said pixelated beam through a first lens;
means for redirecting said pixelated beam with a beam splitter;

means for changing the polarization of said pixelated beam through a quarter waveplate; and means for matching said pixelated beam onto a planar modulator.

110. The system of claim 107 wherein said planar modulator includes at least one fixed transmission mask.

111. The system of claim 107 wherein said planar modulator includes at least one fixed reflection mask.

112. The system of claim 107 wherein said planar modulator includes at least one spatial light modulator.

113. The system of claim 112 wherein said spatial light modulator is a transmission modulator.

114. The system of claim 112 wherein said spatial light modulator is a reflection modulator.

115. The system of claim 107 wherein said planar modulator includes at least one hologram.

116. The system of claim 107 wherein said planar modulator includes at least one diffractive mask.

117. The system of claim 107 wherein said means for projecting comprises:

means for changing the polarization of said pixilated beam through a quarter waveplate; and means for focusing said pixilated beam through a second lens.

118. The system of claim 107 further comprising at least one amplitude modulator disposed in said waveguide array.

119. The system of claim 107 further comprising at least one fixed attenuator disposed in said waveguide array.

120. The system of claim 107 further comprising at least one phase modulator disposed in said waveguide array.

121. The system of claim 107 further comprising at least one device imposing a fixed phase difference, between said input and said output beams, said device disposed in said waveguide array.

122. The system of claim 107 wherein said slab waveguide further comprises at least one slit disposed at a second end thereof.

123. The system of claim 107 wherein said slab waveguide further comprises at least one optical fiber disposed at a second end thereof.

124. The system of claim 107 wherein said slab waveguide further comprises at least one output waveguide disposed at a second end thereof.

125. The system of claim 107 wherein said focus element comprises a lens.

126. The system of claim 107 wherein said focus element comprises a curved mirror.

127. The system of claim 107 wherein said focus element comprises a curved portion of said spectral disperser.

128. A system for generating an optical transmission, comprising:

an input port receiving a pulsed light beam;

means for imposing a spatial pattern onto said pulsed light beam with a planar modulator;

means for projecting said pulsed light beam onto a spectral disperser;

means for focusing said pulsed light beam and directing it to an output port, said output port having an aperture to receive a portion of said focused beam; and means for transversely changing the position of said aperture to change a center wavelength of said pulsed light beam.

129. A system for generating an optical transmission, comprising:

at least one input port receiving a pulsed light beam having a bandwidth;

means for directing said pulsed light beam through an input slab waveguide;

means for dispersing said pulsed light beam to a spectral disperser coupled to said input slab waveguide, said spectral disperser having a free spectral range;

an output slab waveguide coupled to said spectral disperser at a first end; and means for sending said pulsed light beam through at least one output waveguide coupled to said output slab waveguide.

130. The system of claim 129 wherein said spectral disperser comprises a waveguide array.

131. The system of claim 129 wherein said waveguide array includes at least one amplitude modulator.

132. The system of claim 130 wherein said waveguide array includes at least one phase modulator.

133. The system of claim 130 wherein said waveguide array includes at least one fixed waveguide loss.

134. The system of claim 130 further comprising at least one device imposing a fixed phase difference, between said input and said output beams, said device disposed in said waveguide array.

135. The system of claim 129 wherein said free spectral range is less than said bandwidth.

136. The system of claim 129 wherein said output slab comprises at least one output slit at said second end.

137. The system of claim 129 wherein said output slab is coupled to at least one optical fiber at said second end.

138. The system of claim 129 wherein said output waveguide includes at least one optical fiber.

139. The system of claim 129 further comprising means for imposing a spatial pattern on said pulsed light beam.

140. The system of claim 129 wherein said means for imposing includes a planar modulator disposed in said input slab waveguide.

141. The system of claim 129 wherein said means for imposing includes a planar modulator disposed in said waveguide array.

142. The method of claim 129 wherein said means for imposing includes a diffractive mask disposed in said input slab waveguide.

143. The system of claim 129 further comprising means for spatially selecting a portion of said pulsed light beam with at least one slit on said output waveguide at a second end.

144. The system of claim 129 further comprising means for spatially selecting a portion of said pulsed light beam with at least one optical fiber on said output waveguide at a second end.

145. The system of claim 129 further comprising means for controlling chirp.

146. The system of claim 145 wherein said means for controlling chirp further comprises means for changing said length distance.

147. The system of claim 145 wherein said means for controlling chirp further comprises means for forming a curved phase front on said pulsed light beam at said spectral disperser.

148. The system of claim 145 further comprising means for varying the position of said output waveguide thereby changing a center wavelength of said pulsed light beam.

* * * * *